United States Patent [19]

Schora, Jr. et al.

[11] 4,247,240

[45] Jan. 27, 1981

[54] SOLIDS FEEDER HAVING A SOLIDS-LIQUID SEPARATOR

[75] Inventors: Frank C. Schora, Jr., Palatine; Kenneth B. Burnham, Jr., Chicago, both of Ill.

[73] Assignee: Institute of Gas Technology, Chicago, Ill.

[21] Appl. No.: 86,647

[22] Filed: Oct. 22, 1979

[51] Int. Cl.³ .................................................. B65G 65/46
[52] U.S. Cl. .................................... 414/218; 414/221; 414/290; 422/219; 422/232; 422/242
[58] Field of Search ................................ 414/217–221, 414/290; 210/196, 433 R; 422/219, 232, 242

[56] References Cited

U.S. PATENT DOCUMENTS

| 3,729,105 | 4/1973 | Huebler et al. .................... 414/218 |
| 3,950,146 | 4/1976 | Funk .................................. 414/217 X |

*Primary Examiner*—Jeffrey V. Nase
*Attorney, Agent, or Firm*—Thomas W. Speckman

[57] ABSTRACT

An apparatus for transferring solid materials between zones of substantially different pressures, the solid materials being supplied to a lockhopper containing a liquid having a density less than the solid materials, the solid materials with associated liquid passing through a solids-liquid separator chamber separating the solid materials and liquids so that the solid materials, substantially free of liquids, are passed into a vessel such as a pressurized reaction vessel.

11 Claims, 2 Drawing Figures

SOLIDS FEEDER HAVING A SOLIDS-LIQUID SEPARATOR

BACKGROUND OF THE INVENTION

1. Field of the Invention

This invention relates to an apparatus for transferring solid materials between zones of substantially different pressures, the solid materials being supplied to a lockhopper containing a liquid having a density less than the solid materials, the solid materials with associated liquid passing through a solids-liquid separator chamber separating the solid materials and liquids so that the solid materials substantially free of liquids, are passed into a vessel such as a pressurized reaction vessel. The liquid in the lockhopper acts as a liquid seal between the pressurized reaction vessel and lockhopper which is at a much lower pressure. Utilization of the solids-liquid separator chamber provides more rapid recycling of the lockhopper, prevents liquid from being carried into the reactor vessel if there is a pressure surge and allows handling finer solid materials.

2. Description of the Prior Art

Several methods utilizing different apparatus have been used in the past for the introduction of solids into pressurized reactors. Gas pressurized lockhoppers have been used for transferring solids into a pressurized reactor. Solids are added to a lockhopper at ambient pressure and the lockhopper closed and pressurized with gas to the pressure of the reactor. The solids are then added to the reactor which is at about the same pressure as the lockhopper. The lockhopper must then be isolated from the reactor and reduced to ambient pressures for introduction of the solid materials. Gas pressurized lockhoppers require complicated valving and in practice, have long cycle times.

Lockhoppers are frequently constructed in the form of a long gravity feed leg above the reactor to overcome the pressure differential and thus are feasible over relatively small pressure differentials in the order of about 10 psi, due to the high pressure legs required. U.S. Pat. Nos. 2,626,230 and 2,885,099 relate to different gravity feed leg configurations but do not overcome the basic problems of length of the leg required for high pressure differentials.

High density liquids are suggested by U.S. Pat. Nos. 2,704,704 and 3,009,588 to develop the desired pressure differential, but the liquids suggested, such as molten lead, mercury, tin, provide severe economic and environmental disadvantages.

Sealing liquid such as water, is suggested by U.S. Pat. No. 2,828,026 in a system employing a drum with rotating feeder buckets. The operating pressure of a retort is balanced by a liquid standpipe and is again restricted to use over small pressure differentials, due to the height requirements of the liquid standpipe.

U.S. Pat. No. 2,925,928 suggests feeding coarse solids through a fluidized bed of finely divided solids in a standpipe to balance the pressure difference between two zones of different pressure. However, use of this system over pressure differentials of only about 10 to 20 psi is practical.

U.S. Pat. No. 3,729,105 teaches a lockhopper which contains liquid, serving as a liquid seal, through which a higher density solid falls and is fed to a pressurized vessel by a feeder, such as a screw feeder. This system may be used with higher pressure differentials than prior systems, but has disadvantages of the solids carrying undesired liquids into the pressurized vessel, especially with small particle size solids, and permits the liquid to be carried into the pressurized vessel, such as a reactor, if there is a depressurization surge in the reactor. It is apparent that in many reaction systems entry of the liquid into the reactor may be ruinous.

SUMMARY OF THE INVENTION

The apparatus of this invention for transferring solid materials between a storage means or bin and a closed vessel or reactor of substantially different pressures comprises in combination a solid materials storage means, a closed lockhopper containing a liquid having a density less than the density of the solid materials, a feeder means between a solids outlet of the lockhopper and the inlet of a solids-liquid separator chamber, and a screen separator means within the separator chamber sized to retain solid materials and pass them into the closed vessel or reactor while permitting passage of the liquid for recycle to the lockhopper. The closed lockhopper has a valved inlet in its upper portion and a valved outlet in its lower portion. A solid materials transfer means is provided for transfer of solid material from the storage means to the lockhopper inlet. A single liquid feed tank is provided having a liquid return conduit from the upper portion of the lockhopper to the lower portion of the tank and a liquid supply-withdrawal conduit from the lower portion of the lockhopper to the lower portion of the tank with a pump in the supply-withdrawal conduit for supply or withdrawal of liquid to or from the lockhopper for pressure adjustment. The solids-liquid separator chamber has an inlet in its upper portion in communication with a feeder means which is in communication with the lockhopper valved outlet. A solids outlet is provided below the inlet and passes from the separator chamber to the closed vessel. Within the solids-liquid separator chamber a screen separator means sized to retain the solid materials and permit passage of the liquid connects the separator chamber inlet and the solids outlet. A liquid reservoir is provided in the lower portion of the separator chamber and conduit means with pump means provides recycle of the liquid to the lockhopper. The solid materials and associated liquid are supplied by the feeder means to the upper portion of the screen separator means, the solid materials being retained on top of the screen separator means and passing out of the solids outlet into the closed vessel or reactor while the liquid passes through the screen separator means to the liquid reservoir at the bottom of the solids-liquid separator chamber for recycle to the lockhopper.

The apparatus of this invention overcomes disadvantages of prior art apparatus for transferring solid materials between zones of substantially different pressures by providing removal of substantially all of the liquid from the solids prior to introduction into a reactor and prevents liquid used in the lockhopper system from being carried into a reactor if there is a pressure surge in the system.

These and other objects, advantages and features of this invention will be apparent from the description together with the drawing.

DESCRIPTION OF THE PREFERRED EMBODIMENTS

Figures 1, 2:
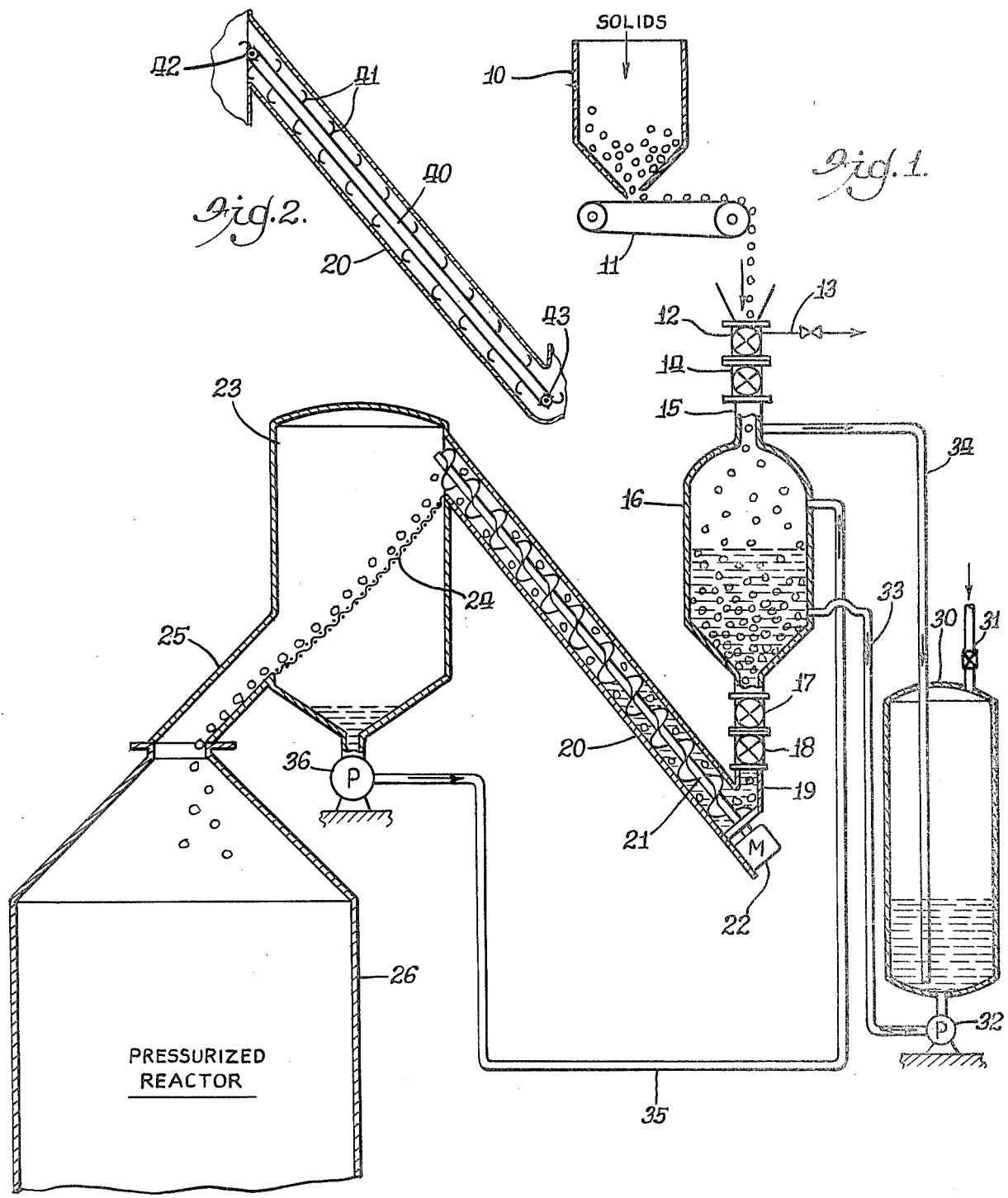
FIG. 1 shows a schematic partially sectioned view of an apparatus according to one embodiment of this invention.
FIG. 2 shows a sectional view of a different type of feeder means useful in another embodiment of the apparatus of this invention.

Referring to FIG. 1, solids are stored in solids storage means 10 shown as an open bin-type hopper. The solids may be in particulate form of any desired shape or size for most expeditious use in any type of chemical reaction carried on in a closed pressurized reactor. Most usually, the solid particulates are in the order of 1 mm to 10 cm in diameter. Solids storage means 10 may be used to measure the quantity of solids desired. Solid transfer means is shown as endless belt 11 around a drive pulley and an idler pulley and positioned such that when in operation, the belt transfers solids from solids storage means 10 to lockhopper inlet valve 12. It is seen that when solids transfer means 11 is not in operation, the endless belt provides a closure for the opening at the bottom of solids storage means 10, thus permitting opening of the main lockhopper inlet valves to the atmosphere.

Lockhopper 16 is shown with inlet conduit 15 and two inlet valves 12 and 14. Likewise, at the bottom of the lockhopper, outlet conduit 19 is shown with two outlet valves 17 and 18. Multiple inlet and outlet valves for isolation of the lockhopper are desired to assure satisfactory inlet closure when required. Lockhopper inlet valve 12 is shown with purge means 13, a valved purge conduit. A liquid pressure seal is formed by the liquid in lockhopper 16. The liquid may be any liquid having a density lower than that of the solids being transferred and preferably, non-reactive with the solids. For many uses, water is a suitable liquid. A liquid feed tank 30 has liquid supply conduit 31 to supply liquid to the system from an exterior source. Liquid in liquid feed tank 30 may be supplied to lockhopper 16 by pump 32 in liquid supply-withdrawal conduit 33, or liquid in lockhopper 16 may be withdrawn through supply-withdrawal conduit 33 by pump 32 to liquid feed tank 30 to provide the desired pressure compensation in lockhopper 16. Liquid return conduit 34 is shown from the upper portion of lockhopper 16 to liquid feed tank 30. Liquid return conduit 34 provides for passage of liquid displaced by solids in lockhopper 16.

Lockhopper outlet conduit 19 supplies solids from lockhopper 16 to feeder means chamber 20. FIG. 1 shows screw feeder 21 activated by motor 22 supplying solids from the bottom of lockhopper 16 to the upper portion of solids-liquid separator chamber 23. It is seen that when the lockhopper outlet valves 17 and 18 are opened, liquid from lockhopper 16 flows into feeder means chamber 20.

FIG. 2 shows another embodiment of a feeder means useful in the apparatus of this invention. FIG. 2 shows feeder means chamber 20, representing the same feeder means chamber 20 as shown in FIG. 1 and enclosing continuous belt feeder 40 trained over belt drive wheel 42 and belt idler wheel 43. Continuous belt feeder 40 has spaced buckets 41 which convey solids from the bottom of feeder means 20 to the upper portion of solids-liquid separator chamber 23.

Solids-liquid separator chamber 23 has screen separator means 24 leading from the solids inlet in the upper portion of the chamber to the solids outlet to the pressure vessel in the lower portion of the chamber. The screen separator means is sized to retain the solid particulates on its upper surface and permit passage of the liquid to a liquid reservoir portion in the lower portion of the separator chamber. By the terminology "screen separator means" is meant any perforated material, formed material, woven material and the like, which provides through passageways for the liquid to the lower portion of the solids-liquid separator chamber while retaining the solid particulates and guiding them to the solids outlet. The solids-liquid separator chamber separates substantially all of the liquid from the solid particles by the tumbling, rolling action of the particles. Removal of associated liquid from the solid particles is important in many instances where as low as a few percent liquid carried over into a pressurized reactor seriously affects the reaction. Further, in prior lockhopper reactor feed systems not having solids-liquid separation as the apparatus of this invention, pressure or depressurization surges would cause liquid to be carried into the reactor and frequently necessitate shutdown and cleanout of the entire system. The solids-liquid separation step of the apparatus of this invention also makes possible handling of smaller particles than prior lockhopper feed systems. The solids-liquid separator also provides flexibility in allowing use of various feeder means from the bottom of the solids-liquid containing lockhopper to the pressurized reactor, such as the continuous belt feeder with buckets as illustrated in FIG. 2.

In operation, the lockhopper and feeder means are filled about halfway with liquid. The lockhopper outlet valves are closed, the lockhopper inlet valves are open, and solids are fed into the lockhopper. As the solids drop into the lockhopper they collect in the lower portion and the liquid displaced rises to the upper portion and if there is excess liquid, it returns to the liquid feed tank. The lockhopper inlet valves are then closed and the pressure within the lockhopper adjusted by supplying or withdrawing liquid by pump 32. When the pressure differential between the reactor and the lockhopper is compensated for, lockhopper outlet valves are opened and the solids drop and are fed by the feeder means to the solids-liquid separator. The liquid level in the feeder means and lockhopper is maintained by pump 32 at a sufficient height to prevent backflow from the reactor into the lockhopper. When the solids have been completely fed to the solids-liquid separator, the lockhopper outlet valves are closed and the lockhopper inlet valves are opened and the cycle repeated. Continuous solid feed may be achieved by having multiple valved lockhoppers used in parallel to feed the feeder means.

The apparatus of this invention may be built of any suitable materials known to the art providing desired structural properties and resistance to corrosion and abrasion of the materials involved. The lockhopper valves, solids transfer means and feeder means may all be motor operated and together with pumps 32 and 36, electronically controlled to provide a completely automatic operation. Techniques for providing such automatic operation are well known in the art and apparent to one reading this disclosure.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In an apparatus for transferring solid materials between zones of substantially different pressures of the type comprising a solid materials storage means supplying said solid materials through a first valve to a lockhopper containing a liquid having a density less than said solid materials, a vessel to receive said solid materials, said solid materials discharged from the lower end of said lockhopper through a second valve to a feeder means for removing said solid materials from said lockhopper, and a liquid pump operable to add liquid to or remove liquid from said lockhopper to increase and decrease pressure within said lockhopper, the improvement comprising: a solids-liquid separator chamber at the same pressure as said vessel, an inlet in the upper portion of said separator chamber in communication with said feeder means, a solids outlet below said inlet passing from said separator chamber to said vessel, a screen separator means sized to retain said solid materials and permit passage of said liquid connecting said separator chamber inlet and said solids outlet, a liquid reservoir portion in the lower portion of said separator chamber, conduit means in communication with said liquid reservoir portion and said lockhopper and pump means in communication with said conduit means recycling said liquid to said lockhopper, said solid materials and associated liquid being supplied by said feeder means to the upper portion of said screen separator means, the solid materials being retained on top of the screen separator means and passing out of said solids outlet into said vessel and the liquid passing through the screen separator means to said liquid reservoir portion for recycle to said lockhopper.

2. The apparatus of claim 1 wherein said feeder means is a screw feeder.

3. The apparatus of claim 1 wherein said feeder means is a continuous belt feeder.

4. The apparatus of claim 3 wherein said continuous belt feeder is provided with multiple buckets.

5. An apparatus for transferring solid materials between a storage means and a closed vessel of substantially different pressures comprising in combination: a solid materials storage means; a closed lockhopper having a valved inlet in its upper portion and a valved outlet in its lower portion; a solid materials transfer means capable of transferring solid materials from said storage means to said lockhopper inlet; a liquid having a density less than said solid materials within said lockhopper; a single liquid feed tank having a liquid return conduit from the upper portion of said lockhopper to the lower portion of said tank, a liquid supply-withdrawal conduit from the lower portion of said lockhopper to the lower portion of said tank and a pump in communication with said supply-withdrawal conduit for supply or withdrawal of liquid to or from said lockhopper; a solids-liquid separator chamber in communication with said lockhopper and said closed vessel and at the same pressure as said vessel, an inlet in the upper portion of said separator chamber in communication with a feeder means in communication with said lockhopper valved outlet, a solids outlet below said inlet passing from said separator chamber to said vessel, a screen separator means sized to retain said solid materials and permit passage of said liquid connecting said separator chamber inlet and said solids outlet, a liquid reservoir portion in the lower portion of said separator chamber, conduit means in communication with said liquid reservoir portion and said lockhopper and pump means in communication with said conduit means recycling said liquid to said lockhopper, said solid materials and associated liquid being supplied by said feeder means to the upper portion of said screen separator means, the solid materials being retained on top of the screen separator means and passing out of said solids outlet into said vessel and the liquid passing through the screen separator means to said liquid reservoir portion for recycle to said lockhopper.

6. The apparatus of claim 5 wherein said solid materials transfer means comprises an endless belt conveyor.

7. The apparatus of claim 5 additionally comprising purge means in said valved inlet.

8. The apparatus of claim 5 wherein said valved inlet and said valved outlet each comprise two valves in series.

9. The apparatus of claim 5 wherein said feeder means is a screw feeder.

10. The apparatus of claim 5 wherein said feeder means is a continuous belt feeder.

11. The apparatus of claim 10 wherein said continuous belt feeder is provided with multiple buckets.

* * * * *